(12) United States Patent
Whitehead et al.

(10) Patent No.: US 6,469,663 B1
(45) Date of Patent: Oct. 22, 2002

(54) METHOD AND SYSTEM FOR GPS AND WAAS CARRIER PHASE MEASUREMENTS FOR RELATIVE POSITIONING

(75) Inventors: Michael L. Whitehead, Scottsdale, AZ (US); Walter Feller, Airdrie (CA)

(73) Assignee: CSI Wireless Inc. (CA)

( * ) Notice: Subject to any disclaimer, the term of this patent is extended or adjusted under 35 U.S.C. 154(b) by 0 days.

(21) Appl. No.: 09/695,530

(22) Filed: Oct. 24, 2000

Related U.S. Application Data
(60) Provisional application No. 60/191,026, filed on Mar. 21, 2000.

(51) Int. Cl.[7] ............................. G01S 5/02; H04B 7/185
(52) U.S. Cl. ......................... 342/357.03; 342/357.09; 342/357.1; 701/215
(58) Field of Search ....................... 342/357.03, 357.09, 342/357.1; 701/215

(56) References Cited

U.S. PATENT DOCUMENTS

| | | | |
|---|---|---|---|
| 4,170,776 A | 10/1979 | MacDoran | 343/112 D |
| 4,667,203 A | 5/1987 | Counselman, III | 342/357 |
| 4,812,991 A | 3/1989 | Hatch | 364/458 |
| 4,963,889 A | 10/1990 | Hatch | 342/357 |
| 5,148,179 A | 9/1992 | Allison | 342/357 |
| 5,177,489 A | 1/1993 | Hatch | 342/357 |
| 5,293,170 A | 3/1994 | Lornez et al. | 342/352 |
| 5,296,861 A | 3/1994 | Knight | 342/357 |
| 5,359,332 A | 10/1994 | Allison et al. | 342/357 |
| 5,442,363 A | 8/1995 | Remondi | 342/357 |
| 5,451,964 A | 9/1995 | Babu | 342/357 |
| 5,519,620 A | 5/1996 | Talbot et al. | 364/449 |
| 5,828,336 A | 10/1998 | Yunck et al. | 342/357 |
| 5,877,725 A | 3/1999 | Kalafus | 342/357 |
| 5,890,091 A | 3/1999 | Talbot et al. | 701/215 |
| 5,914,685 A | 6/1999 | Kozlov et al. | 342/357 |
| 5,936,573 A | 8/1999 | Smith | 342/357 |
| 5,944,770 A | 8/1999 | Enge et al. | 701/207 |
| 5,949,371 A | 9/1999 | Nichols | 342/352 |
| 6,230,097 B1 * | 5/2001 | Dance et al. | 701/207 |
| 6,307,505 B1 * | 10/2001 | Green | 342/357.09 |

OTHER PUBLICATIONS

Global Positioning System Standard Positioning Service Signal Specification; 2nd Edition, Jun. 2, 1995.
GPS Interface Control Document ICD–GPS–200C; Navstar GPS Space Segment and Navigation User Interfaces; IRN–200C–002; Sep. 25, 1997—reprinted Feb. 1998.
Minimum Operational Performance Standards for Global Positioning System/Wide Area Augmentation System Airborne Equipment; RTCA (Requirements and Technical Concepts for Aviation); Document No. RTCA/DO–229A; Jun. 8, 1998; Prepared by: SC–159.

\* cited by examiner

*Primary Examiner*—Theodore M. Blum
(74) *Attorney, Agent, or Firm*—Cantor Colburn LLP

(57) ABSTRACT

A technique of accurately determining the relative position between two points using carrier phase information from receivers capable of making code and carrier phase measurements on signals transmitted from GPS satellites as well as signals transmitted from WAAS, EGNOS, MSAS or other Wide Area Augmentation System satellites (hereafter referred to simply as WAAS satellites). These signals are processed by a receiving system to determine relative position, for the purpose of surveying or otherwise, with the accuracy of carrier phase measurements being obtained. Signal processing similar to that used in existing GPS carrier phase based relative positioning receivers is used with WAAS signals as well. Benefits include faster and more reliable integer ambiguity resolution, protection from cycle slips and loss of sufficient satellites, and possibility of extending the operating range by allowing increased separation of reference and base receivers by incorporating ionospheric models provided by WAAS.

70 Claims, 5 Drawing Sheets

METHOD AND SYSTEM FOR GPS AND WAAS CARRIER PHASE MEASUREMENTS FOR RELATIVE POSITIONING

CROSS REFERENCE TO RELATED APPLICATIONS

This application claims the benefit of U.S. Provisional Application No. 60/191,026 filed Mar. 21, 2000, which is incorporated herein by reference.

BACKGROUND OF THE INVENTION

1. Field of the Invention

The invention relates generally to Global Positioning System (GPS) receivers and more particularly to a method and an apparatus for computing a precise location using differential carrier phases of a GPS satellite signal and a Wide Area Augmentation System (WAAS) or similar satellites.

2. GPS Background

The Global Positioning System (GPS) was established by the United States government, and employs a constellation of 24 or more satellites in well-defined orbits at an altitude of approximately 26,500 km. These satellites continually transmit microwave L-band radio signals in two frequency bands, centered at 1575.42 MHz and 1227.6 MHz., denoted as L1 and L2 respectively. These signals include timing patterns relative to the satellite's onboard precision clock (which is kept synchronized by a ground station) as well as a navigation message giving the precise orbital positions of the satellites. GPS receivers process the radio signals, computing ranges to the GPS satellites, and by triangulating these ranges, the GPS receiver determines its position and its internal clock error. Different levels of accuracies can be achieved depending on the techniques deployed. This invention specifically targets the sub-centimeter accuracies achievable on a remote and possibly mobile GPS receiver by processing carrier phase observations both from the remote receiver and from one or more fixed-position reference stations. This procedure is often referred to as Real-Time-Kinematic or RTK.

To gain a better understanding of the accuracy levels achievable by using the GPS system, it is necessary understand the two types of signals available from the GPS satellites. The first type of signal includes both the Coarse Acquisition (C/A), which modulates the L1 radio signal and precision (P) code, which modulates both the L1 and L2 radio signals. These are pseudorandom digital codes that provide a known pattern that can be compared to the receiver's version of that pattern. By measuring the time-shift required to align the pseudorandom digital codes, the GPS receiver is able to compute an unambiguous pseudo-range to the satellite. Both the C/A and P codes have a relatively long "wavelength," of about 300 meters (1 microsecond) and 30 meters (1/10 microsecond), respectively. Consequently, use of the C/A code and the P code yield position data only at a relatively coarse level of resolution.

The second type of signal utilized for position determination is the carrier signals. The term "carrier", as used herein, refers to the dominant spectral component which remains in the radio signal after the spectral content caused by the modulated pseudorandom digital codes (C/A and P) is removed. The L1 and L2 carrier signals have wavelengths of about 19 and 24 centimeters, respectively. The GPS receiver is able to "track" these carrier signals, and in doing so, make measurements of the carrier phase to a small fraction of a complete wavelength, permitting range measurement to an accuracy of less than a centimeter.

In stand-alone GPS systems that determine a receiver's position coordinates without reference to a nearby reference receiver, the process of position determination is subject to errors from a number of sources. These include errors in the satellite's clock reference, the location of the orbiting satellite, ionospheric induced propagation delay errors, and tropospheric refraction errors. A more detailed discussion of these sources of error is provided in U.S. Pat. No 5,828,336 by Yunck, et al. A large portion of the satellite's clock error, referred to as Selective Availability (SA) is purposefully induced by the U.S. Department of Defense to limit GPS accuracy to non-authorized users. SA can cause positioning errors exceeding 40 meters, but even without SA, errors caused by the ionosphere can be tens of meters.

To overcome the errors of the stand-alone GPS system, many kinematic positioning applications make use of multiple GPS receivers. A reference receiver located at a reference site having known coordinates receives the satellite signals simultaneously with the receipt of signals by a remote receiver. Depending on the separation distance, many of the errors mentioned above will affect the satellite signals equally for the two receivers. By taking the difference between signals received both at the reference site and at the remote location, these errors are effectively eliminated. This facilitates an accurate determination of the remote receiver's coordinates relative to the reference receiver's coordinates.

The technique of differencing signals is known in the art as differential GPS (DGPS). The combination of DGPS with precise measurements of carrier phase leads to position accuracies of less than one centimeter root-mean-squared (centimeter-level positioning). When DGPS positioning utilizing carrier phase is done in real-time while the remote receiver is potentially in motion, it is often referred to as Real-Time Kinematic (RTK) positioning.

One of the difficulties in performing RTK positioning using carrier signals is the existence of an inherent ambiguity that arises because each cycle of the carrier signal looks exactly alike. Therefore, the range measurement based upon carrier phase has an ambiguity equivalent to an integral number of carrier signal wavelengths. Various techniques are used to resolve the ambiguity, which usually involves some form of double-differencing. Some prior art related to this is U.S. Pat. No. 4,170,776 by MacDoran, U.S. Pat. No. 4,667,203 by Counselman, U.S. Pat. No. 4,963,889 by Hatch, U.S. Pat. No. 5,296,861 by Knight, and U.S. Pat. No. 5,519,620 by Talbot et al. Once ambiguities are solved, however, the receiver continues to apply a constant ambiguity correction to a carrier measurement until loss of lock on that carrier signal.

Regardless of the technique deployed, the problem of solving integer ambiguities, in real-time, is always faster and more robust if there are more measurements upon which to discriminate the true integer ambiguities. Robust means that there is less chance of choosing an incorrect set of ambiguities. The degree to which the carrier measurements collectively agree to a common location of the GPS receiver is used as a discriminator in choosing the correct set of ambiguities. The more carrier phase measurements that are available, the more likely it is that the best measure of agreement will correspond to the true (relative to the reference GPS) position of the remote GPS receiver. One method, which effectively gives more measurements, is to use carrier phase measurements on both L1 and L2. The problem though is that it is relatively difficult to track L2 because it is modulated only by P code and United States Department of Defense has limited access to P code modulation by encrypting the P code prior to transmission. Some receivers are capable of applying various cross-correlation techniques to track the P code on L2, but these are usually more expensive receivers that L1 only capable receivers (see, for example U.S. Pat. No. 5,293,170 Lorenz, et al.).

Other approaches have been employed to gain additional measurements on GPS receivers in an attempt to enhance RTK. Hatch, for example in "Pseudolite-aided method for precision kinematic positioning" (U.S. Pat. No. 5,177,489) suggests the use pseudolites, which due to their proximity exhibit rapid changes in relative location causing the apparent affect of additional satellites. A derivation of this, which uses Low Earth Orbit (LEO) satellites, that travel across the sky much more rapidly than GPS satellites is presented by Enge, et al. in "Method and receiver using a low earth orbiting satellite signal to augment the global positioning system" (U.S. Pat. No. 5,944,770). The use of the GLObal NAvigation Satellite System (GLONASS) satellites from the former USSR has been spelled out in "Relative position measuring techniques using both GPS and GLONASS carrier phase measurements" by Kozlov, et al. (U.S. Pat. No. 5,914,685).

Nevertheless, it is often desired to perform RTK on low-cost L1 only receivers that do not have access to the GLONASS system, pseudolites, or LEO satellite signals. The present invention describes a new approach of applying Wide Area Augmentation System (WAAS) carrier phase measurements to the solution of the ambiguity problem to give greater speed and reliability of ambiguity solution. Another feature of the present invention is to further use these WAAS measurements to aid in positioning and cycle-slip (loosing track of the integer ambiguity) detection. Yet another feature of the described invention is to extend the operating range of the rover receiver relative to the base receiver unit by using WAAS ionosphere models to remove ionospheric error components that would otherwise prevent or degrade operation as the rover-to-base separation increased. Thus, the present invention exhibits the benefit of improving the overall robustness of the L1-only RTK solution The WAAS system is an augmentation to the current Global Navigation Satellite System (GNSS) that includes GPS, GLONASS and other satellite ranging technologies. It was conceived as a means to meet the stringent integrity, availability, and accuracy requirements necessary to use GPS as the sole means navigation for civilian aviation. The term WAAS here is used as a generic reference to all GNSS augmentation systems which, to date, include three programs: WAAS (Wide Area Augmentation System) in the USA, EGNOS (European Geostationary Navigation Overlay System) in Europe and MSAS (Multifunctional Transport Satellite Space-based Augmentation System) in Japan. Each of these three systems, which are all compatible, consists of a ground network for observing the GPS constellation, and one or more geostationary satellites.

The role of the ground observation network is to determine, in real-time: the operational performance characteristics of any visible GPS satellites; to compute corrections to the information which comes from those satellites; to upload this information to the geostationary satellites; and to control the operation of these geostationary satellites which effectively augment GPS with differential range corrections and additional integrity information.

The WAAS (WAAS, EGNOS, and MSAS) geostationary satellites broadcast signals on the L1 frequency using only a C/A code with a superimposed navigation message. These signals are similar to L1, C/A code broadcast by GPS satellites except that the WAAS signals are modulated with 250 bit-per-second integrity-related information and GNSS satellite range corrections derived from data received from the observation network. All range corrections are relative to the GPS C/A code only (not carrier or P code). For the intentions of WAAS, this is the preferred approach since C/A code is the most straight-forward signal to demodulate (P codes are also broadcast by GPS but are difficult to demodulate due to encryption) and is the ranging signal provided by the GPS satellites for commercial use.

Although WAAS improves robustness over stand-alone GPS and improves positional accuracy to roughly the one-meter level, it, until this invention, has offered little to the precise positioning needs typical of many users of RTK systems. The reason being is, as discussed above, that WAAS is intended to provide enhancements to GPS positioning systems based around measurements of C/A code. Nothing in the WAAS specification (for example see RTCA/DO-229A) relates to the use of WAAS to enhance RTK. Thus, there was a need for a method to enhance RTK employing the employing the advantages WAAS could provide.

SUMMARY OF THE INVENTION

Briefly, a preferred embodiment includes a GPS/WAAS reference receiver that is stationary, a GPS/WAAS rover receiver that may be stationary or may be in motion, and a communication link between them for delivering reference data from the reference receiver to the rover receiver. Both the GPS/WAAS reference receiver and the GPS/WAAS rover receiver determine the carrier phases from GPS satellite signals and at least one WAAS carrier phase from a WAAS satellite signal. Each of the receivers contains a signal processor for processing the data. The GPS/WAAS rover receiver receives an airwave signal that includes reference data for the GPS and the WAAS carrier phases determined at the GPS/WAAS reference receiver and computes a difference between these carrier phases and the carrier phases of the GPS and the WAAS satellite signals determined by the GPS/WAAS rover receiver. The location vector of the rover receiver, relative to the location of the reference receiver, is determined in real-time to centimeter level accuracy by exploiting the GPS and WAAS carrier phase measurements.

The GPS rover receiver computes the location vector from a double or single difference of the GPS rover and reference carrier phases for a plurality of GPS satellites and at least one WAAS satellite. A radio transmits information for the carrier phases, code phases, and the time of measurement determined at the GPS reference receiver to a radio receiver at the GPS rover receiver over a terrestrial link.

According to a more specific aspect of the present invention, in order to solve the integer ambiguity problem, the signal processing is performed in a manner such that the information from the WAAS satellite is exploited to determine the integer number of wavelengths that must be applied to the raw carrier phase difference measurements from both GPS and WAAS satellites. The additional data from the WAAS satellite improves the speed and overall reliability of the process for solving for the correct integer number of wavelengths. The overall result is that the relative position of the rover receiver can be ascertained more quickly and more reliably than without the use of the WAAS satellite.

Another aspect of the invention is the use of the transmitted WAAS ionosphere map to mitigate errors caused by the ionosphere when performing RTK positioning. As the separation between receivers increases, atmospheric effects on the measured pseudoranges and carrier phase observations start to become noticeably different between the rover and reference receiver. Consequently, these errors can no longer be eliminated by the difference. Errors caused by the troposphere can be modeled to some degree, which is especially useful when significant height differences are present between the rover and reference receivers. Prior to the invention described herein, however, there was no convenient or rapid way to determine differences in signal propagation delays induced by the ionosphere.

Another aspect of the invention is the use of WAAS satellites in addition to GPS satellites effectively increases the number of carrier phase measurements that can be used by a receiving system at a particular location. Thus, mitigating difficulties sometimes encountered when one or more GPS satellites are blocked from the view of a receiver by a hill, building, or the like. The concept can be implemented in a number of ways, but stated simply, the more satellites that are tracked, the more likely it is that the tracked satellites will not drop below a critical number necessary to maintain accurate knowledge of the GPS receiver's position. If the position is known, then cycle slips can be corrected by calculating the true geometric range to the satellite, adjusting for known clock errors and comparing the calculated ranges to the measured range involving the suspected cycle slip. If the difference between measured and calculated range is significant (close to a cycle or more) then adjust the measured range to the nearest integer number of cycles to the difference.

Therefore, the present invention provides a Global Positioning System (GPS) remote user receiver, a GPS reference receiver, both capable of making GPS and WAAS satellite measurements, and a method for combining GPS and WAAS carrier phase signals for accurately finding a location vector between the GPS user receiver and the GPS reference receiver.

The present invention also provides a method of combining GPS and WAAS signals for improving the speed and reliability of resolving a number of wavelengths of a satellite signal from a GPS satellite to the GPS receiver and from a WAAS satellite to the GPS.

Another feature of the present invention to provide a method to use the WAAS ionosphere delay map for modeling errors in differential GPS systems utilizing carrier phase measurements, thereby increasing the geographical area of usefulness of a differential carrier phase measurement.

Yet another feature of the present invention is to provide a method of combining WAAS and GPS signals for improving the process of detecting cycle slips in carrier phase while performing RTK positioning. The additional redundancy of the WAAS carrier phase measurements aiding in detecting cycle slips.

IN THE DRAWINGS

Referring now to the drawings wherein like elements are numbered alike in the several FIGURES.

Figure 3:
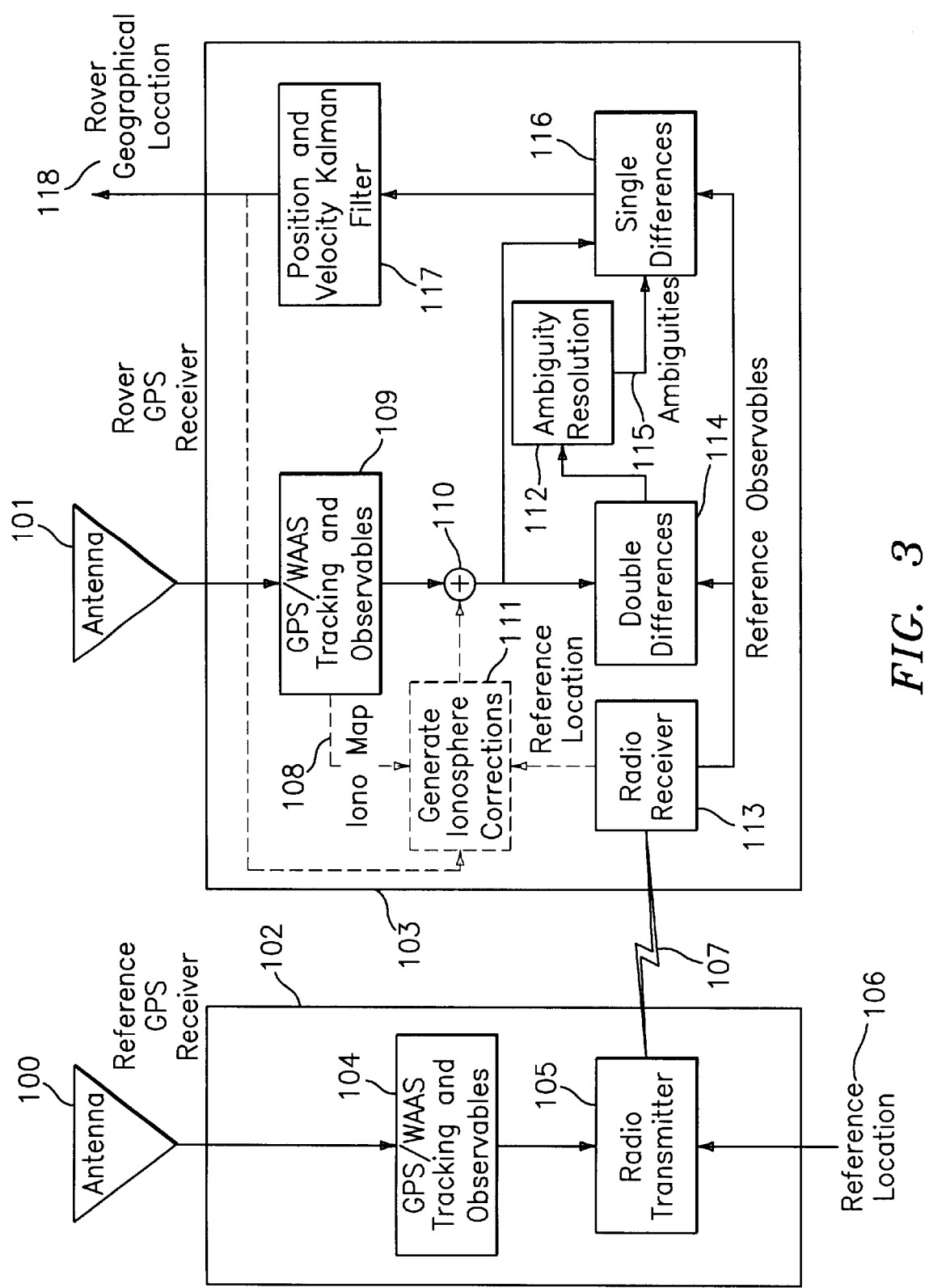
FIG. 3 is a block diagram that illustrates the operation of the reference and rover receivers of FIG. 1.
Figure 4:
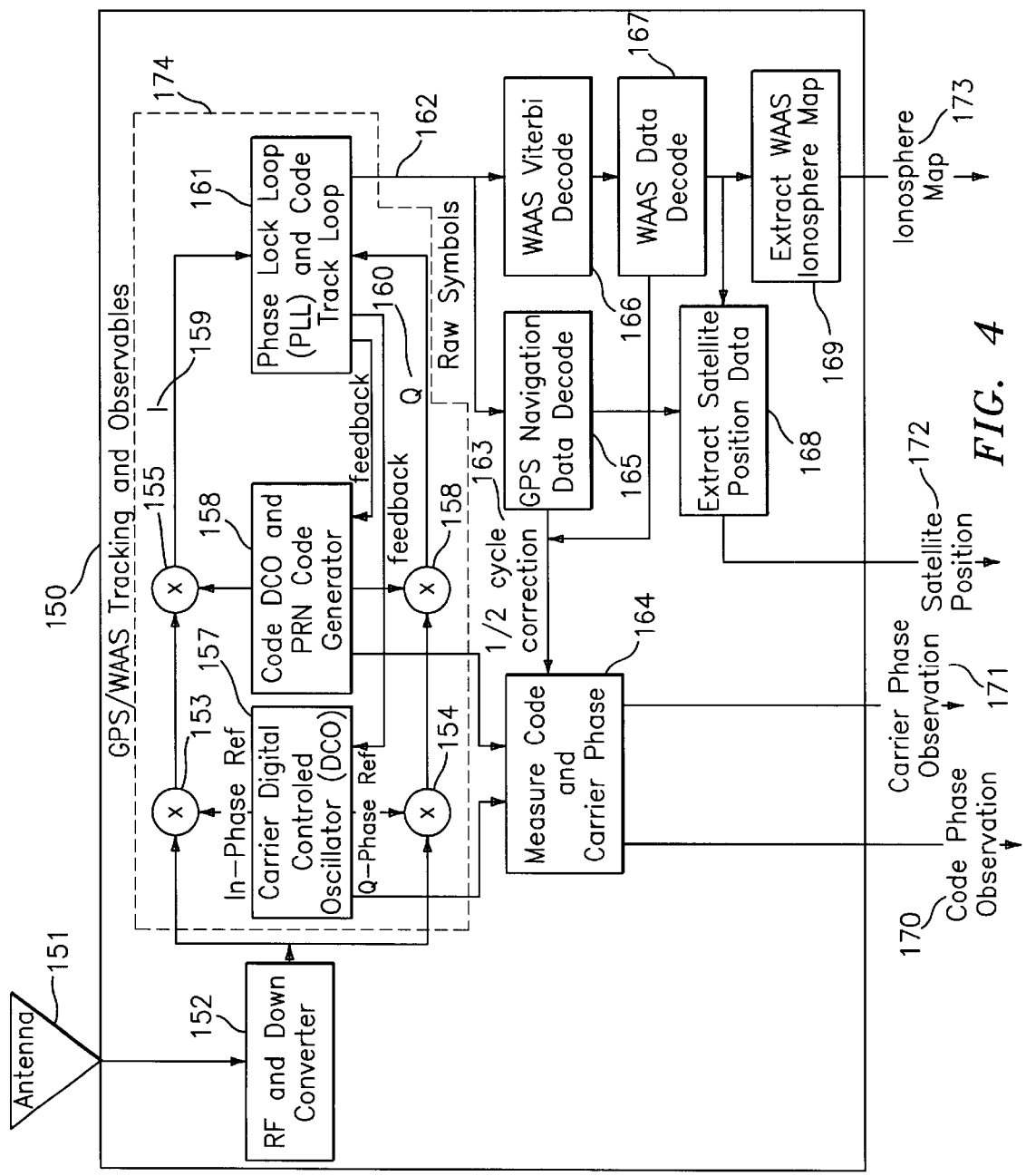
Figure 5A:
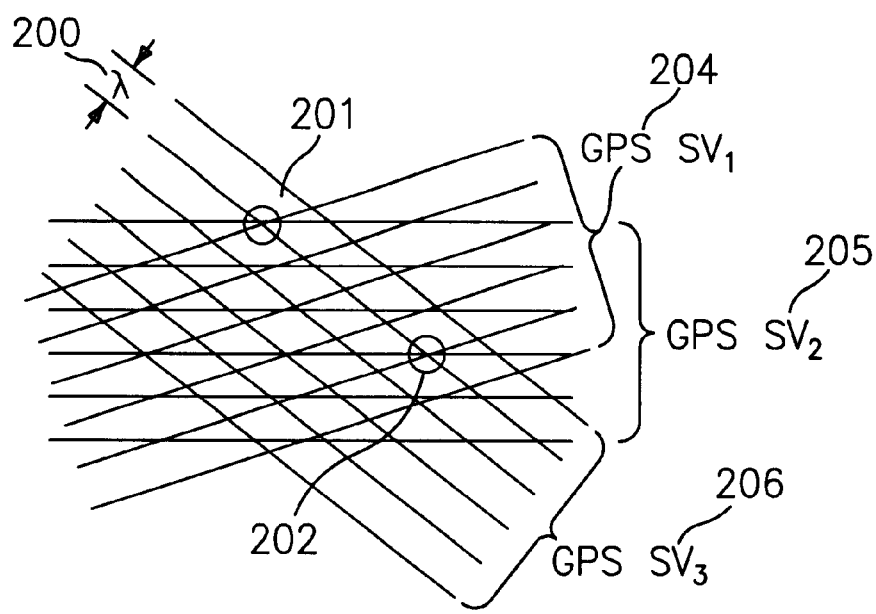
Figure 5B:
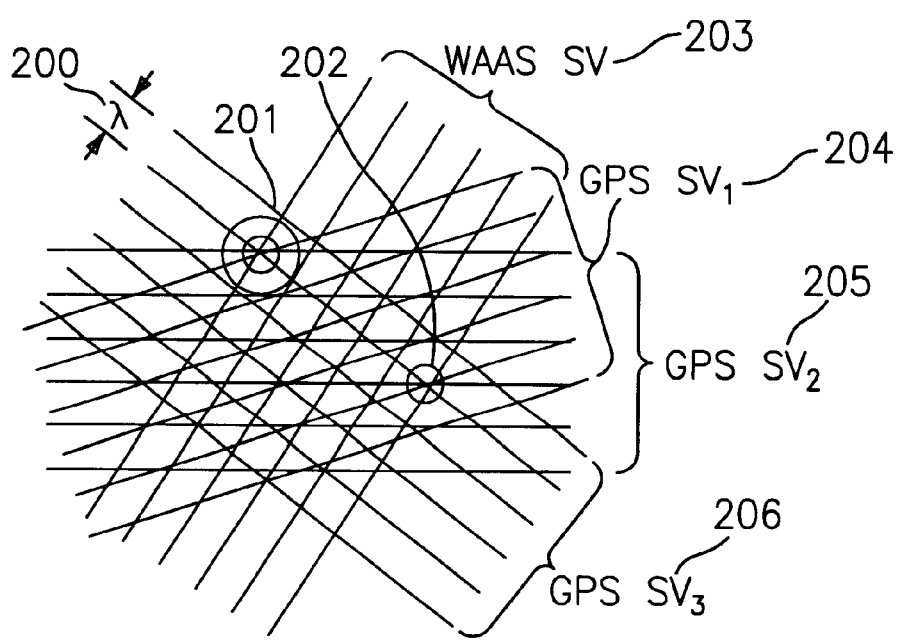

FIG. 4 is a block diagram that provides the details of the operational component of FIG. 3; and FIGS. 5A and 5B is a diagram representing the whole cycle carrier phase wavefronts of signals; FIG. 5A depicting the wavefronts propagated by three GPS satellites and FIG. 5B depicting the same three GPS satellites plus one WAAS satellite. Also shown are the mutual intersections of the wavefronts that represent potential solutions to the integer ambiguities.

DETAILED DESCRIPTION

Figure 1:
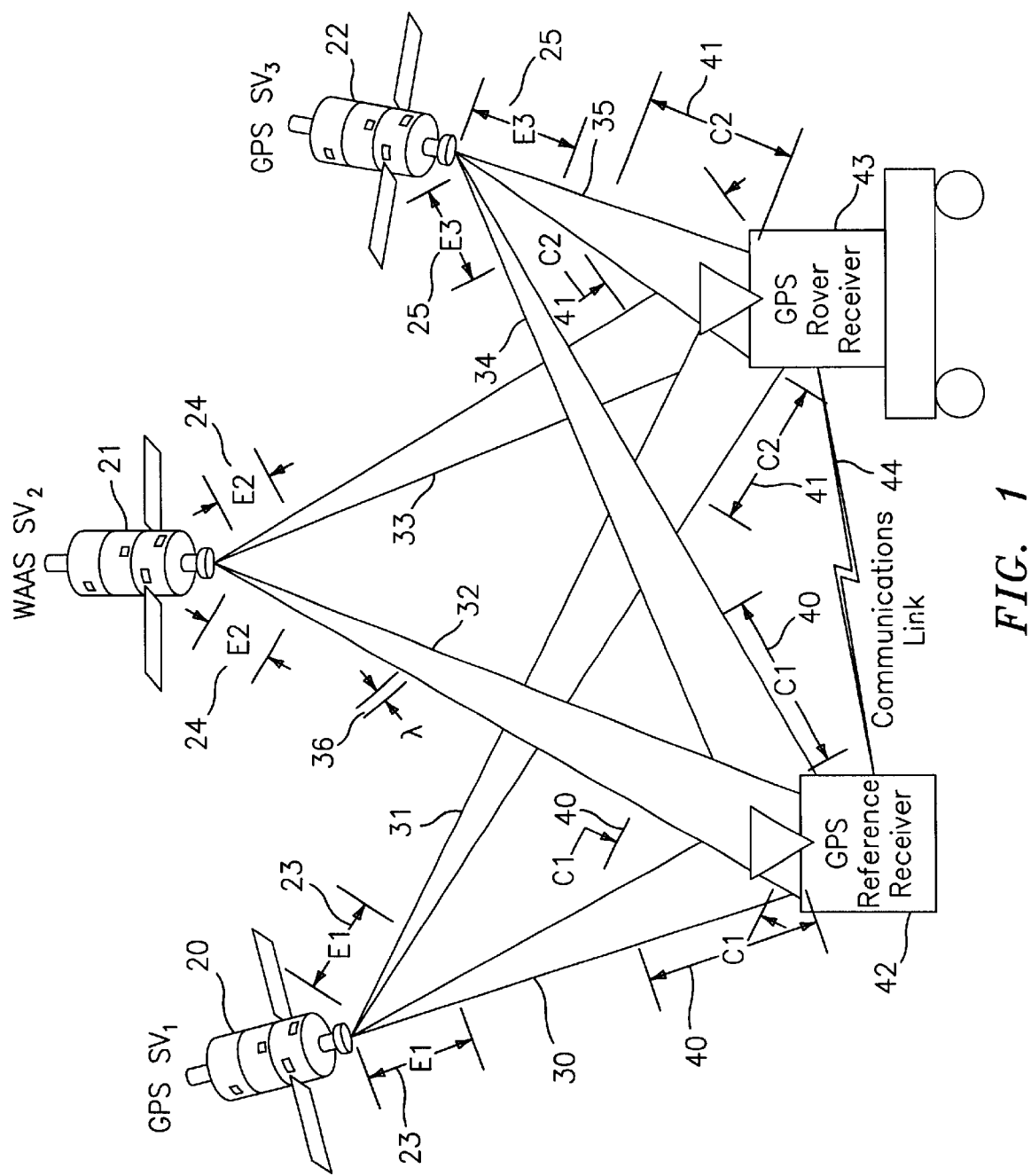
FIG. 1 is a schematic of the GPS and WAAS based real-time kinematic system embodiment of the present-invention.

In FIG. 1, a preferred embodiment of the invention is shown using a plurality of satellites including at least one Global Positioning System (GPS) satellite 20 or 22 and at least one Wide Area Augmentation System (WAAS, EGNOS, MSAS, or others) satellite 21. The GPS satellite 20 or 22 is one of a constellation of approximately twenty-four GPS satellites operated by United States Department of Defense orbiting the Earth approximately twice every twenty-four hours at an altitude of approximately 10,000 miles and traversing the sky above a location on the surface of the Earth in approximately four hours. The WAAS satellite 21 is a geostationary satellite, orbiting at approximately 22,300 miles and transmitting a signal that is intended to improve the integrity and accuracy of code-based, L1 GPS receivers by providing information on this signal that can be used to supplement the GPS L1 Code signals. A plurality of transmitted signals 30–35 contain both L1 code and carriers from GPS and WAAS satellites, where 36 depicts the carrier's wave length. The signals are received by a stationary "Reference" GPS receiver 42 and a "Rover" GPS receiver 43 which can be mobile or stationary. Although not shown, the receivers 42 and 43 could also receive L2 signals from GPS and signals from GLONASS.

Each GPS satellite 20 or 22 broadcasts a GPS satellite signal 30, 31 or 34, 35 having two signals, L1 and L2, broadcast at carrier frequencies about 1575.42 MHz and about 1227.60 MHz, respectively. In the present invention, a GPS rover receiver 43 and a GPS reference receiver 42 may be constructed to receive either the L1 signal or the L2 signal or both with the most benefit being gained for an L1-only receiver. The L1 signal includes a coarse/acquisition (C/A) and a precise (P) code L2 signal includes the precise (P) code modulated on the carrier in direct sequence spread spectrum. A description of the GPS signal structure can be found in either the GPS Interface Control Document ICD-GPS-200, Revision C, October 1995 or in GPS Standard Positioning Specification, Jun. 2, 1995.

The WAAS satellite 21 is one of perhaps multiple geostationary satellites transmitting the WAAS signal 32, 33. The WAAS signal is transmitted on the GPS L1 frequency (1575.42 MHz) and modulated upon this signal is a 1023 bit PRN code similar to that used on GPS as well as a 500 symbol-per-second Viterbi encoded data stream that equates to 250 bits-per-second of user data after Viterbi decoding. Like GPS, the PRN code and data stream is modulated, biphase shift-keyed (BPSK) onto the L1 carrier at a rate of 1.023 Mega-chips-per-second. The WAAS 250 bit-per-second data stream consists of fixed-length packets of 250 bits each that contain integrity information and GPS range correctors. Each packet begins with an 8-bit preamble and the start of the packet is synchronized with the whole GPS second at transmission time from the satellite. More detail on WAAS is available on RTCA/DO-229A, Jun. 8, 1998.

Due to the similarities of the WAAS signal to the L1-C/A code signal on GPS, it is relatively easy to de-modulate the WAAS signal using an inexpensive GPS receiver.

In FIG. 1, the transmitted signals 30 and 31 include a satellite clock error that results in a ranging distance error 23. Similarly, the transmitted signals 32 and 33 include a satellite clock error that results in a ranging distance error 24. As depicted, errors common to a single satellite are seen by both the reference and rover GPS receivers and are thus subtracted away using conventional single difference techniques as described herein. When the receivers 42 and 43 are close (say within 10 miles horizontal), the subtraction process also effectively eliminates atmospheric errors, such as ionosphere and troposphere induced signal delays. Due to the proximity of the reference and rover receivers, the signal from a common satellite essentially travels through the same atmospheric content so that it may be effectively lumped in with satellite clock errors.

Also present are the errors 40, 41 resulting from the GPS receiver's clock not being synchronized exactly to GPS time. Reference receiver, 42, introduces a receiver clock error that results in a ranging distance error 40 that is common to all satellite vehicles. Rover receiver, 43, introduces similar clock error resulting in ranging distance error 41, again common to all satellite vehicles. When applying a single difference to the measured ranges from the rover and reference receivers, the clock errors 40 and 41 are both present in the difference equation. However, their combination may be treated as a single clock error. Since this clock error is common to all satellites, it adds only one additional unknown to the system of equations. This unknown clock error is easily solved for using Least Squares or a Kalman filter while simultaneously solving for the 3 unknowns that constitute the receiver's position. Alternately, the clock errors 40 and 41 may be eliminated by applying a second difference equation; a technique commonly referred to as double-differencing.

Figure 2:
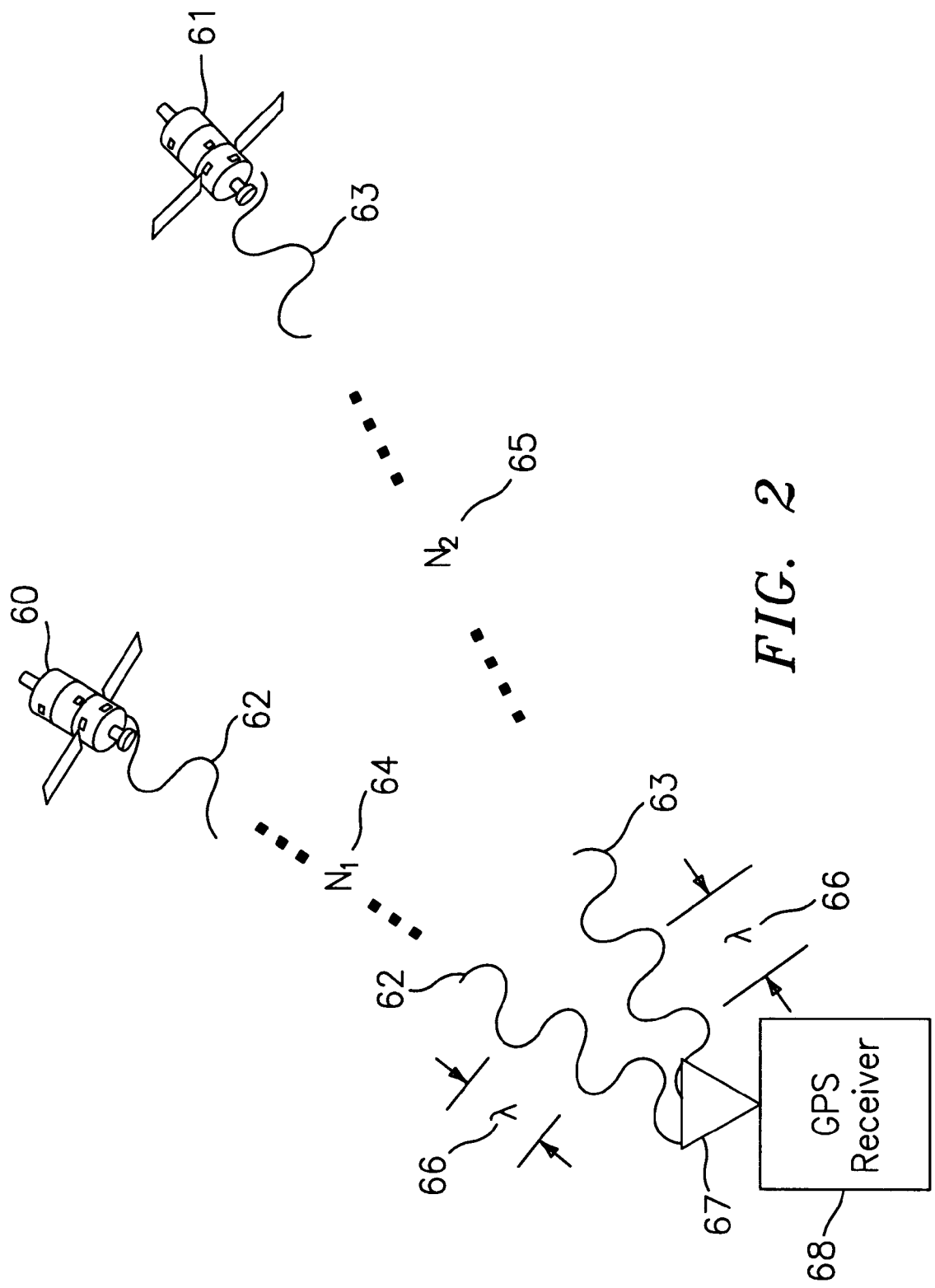
FIG. 2 is a diagram depicting carrier phase ambiguities in two signals received from two satellites by a single GPS receiver.

FIG. 2 shows only the carrier components of signals 62 and 63 transmitted from satellites 60 and 61 respectively. The GPS receiver measures the phase of the carrier signals, however an integer number of cycles, 64, and 65 are missing from the phase measurements due to the lack of a direct measurement technique to determine absolute phase. That is, all cycles 66 of the carrier signal look virtually identical and there is no timing information to distinguish one cycle from another. The unknown cycles are termed "integer ambiguities".

FIG. 3 shows the reference and rover GPS receivers labeled 102 and 103, respectively. Processing is different on each receiver with the parts 104 and 109 that are similar in both, expressed in more detail in FIG. 4. Each receiver 102 and 103 includes digital processing circuitry, a microprocessor, memory, and executable code and variable data stored in the memory operating in a conventional manner for decoding the navigation data; receiving and decoding reference data signals including those of WAAS code and carrier phase and the GPS code and carrier phase. The rover GPS receiver 103 computes the geographical location of the GPS receiver 103 relative to the geographical location 106 of the GPS reference receiver 102 and provides data for the location vector in a user output signal 118. The processing load may be distributed differently, depending on exact implementation. For example, the reference receiver may compute the differential corrections, or it may compute and transmit only raw measurements, leaving the rover to compute the differential corrections implicitly through single differencing raw measurements. Furthermore, the geographical location could be computed in the reference receiver 102 or in another separate computer system altogether.

A radio transmitter 105 located within the GPS reference receiver 102 transmits reference data including the GPS/ reference carrier phase, the WAAS/reference carrier phase, and the GPS/reference code time of arrival in an airwave link 107 to a radio receiver 113 located with the GPS rover receiver 103. Although the term "airwave link" is used, obviously this could be any communication link such as a radio modem, a telephone data link, a dedicated data cable, a wireless Internet connection or any other suitable data link. The radio receiver 113 demodulates the airwave reference data signal 107 and passes the reference data to the GPS rover receiver 103.

In the rover receiver, single and double differences are formed using the GPS/WAAS observations from both the reference and rover receiver. Optional ionospheric corrections 111 are applied the rover's observations to reduce errors caused by non-common, ionosphere-induced, signal propagation delays that can not be differenced away. These ionospheric corrections are made available by processing the WAAS messages for ionosphere and are applied in a unique way that benefits this application.

The ambiguity resolution process 112 makes use of double differences 114. The resolved ambiguities, 115 are fed into the single difference process 116, and the single differences drive a navigation Kalman filter 117 that produces the Geographic Location 118 of the Rover relative to the Geographic Location 106 of the reference receiver.

FIG. 4 depicts the processes of a portion of the GPS receiver that is common to both reference and rover receivers. The WAAS and GPS signals are received by the antenna 151 then down-converted in the RF section 152, and eventually, after being demodulated by 153–158, are tracked by the Phase Lock Loop (PLL) and PRN code tracking loops that are represented by 161. Each channel 174 of the GPS/WAAS receiver requires a separate path, such as that just described, with each channel 174 tracking exactly one satellite. Typical GPS/WAAS receivers utilize between 5 and 24 channels. When the tracking loops 161 have locked and are tracking the code and carrier signals, measurements of code and carrier phase can be obtained by sampling the phases of the two tracking-loop-driven Digitally Controlled Oscillators (DCOs) 157 and 158.

While the code phase is being tracked, the actual symbol bits that are modulated upon the WAAS and GPS signals can be extracted by looking for reversals in the in-phase component, 159, of the tracked signal. Symbol bits are processed differently, depending whether they originate from a GPS satellite track or a WAAS satellite track. The symbols are fed through 165–167 that extract the various messages sent from GPS (the navigation data) or WAAS (the correction and integrity data). Both sets of data, however, ultimately provide the location of the Satellite from which the signal originated. Satellite positions 172, WAAS ionosphere map 173, and Phase observables 170, 171 are shown as the output of these functions and are processed by the rover and reference receivers.

The PLL, 161, tracks crossings in quadrature phase that occur 180 degrees apart. Consequently, in addition to cycle integer ambiguities, the phase measurements can differ by ½ cycle due to the tracking loop. In the measurement of GPS phase, the ½ cycle phase offset is corrected by testing the preamble of the navigation message, determining if the bits are reversed, and then adjusting the phase measurement by ½ cycle, 163, if the preamble is reversed. Unlike GPS, in the WAAS transmission, the navigation-like message is Forward Error Corrected (FEC) using Viterbi encoding (constraint length K=7, rate=½) which effectively doubles the symbol transmission rate. Consequently, Viterbi decoding is necessary before the original WAAS navigation bits can be obtained and the preamble inspected. Several steps are required to gain access to the preamble that include buffering the symbol data, testing two possible combinations of symbol alignment, and finally Viterbi decoding, 166, the data. It is only necessary to test symbol alignment prior to Viterbi-lock since alignment remains fixed until break of lock. The alignment problem arises due to the Viterbi encoding which generates two transmission symbols per data-bit. It is impossible to know in advance which symbol of a symbol pair starts the data-bit. Thus, both combinations must be tested with the discriminator being the bit-error-rate.

Unlike GPS, the preamble in the WAAS message is an 8 bit field that can take one of 3 values which are sent in a predefined order that repeats every 3 seconds. Continuous scanning of all incoming data bits occurs until 2 or more matching preamble patterns are found separated by a bit spacing of one message length, or 250 bits. Both the normal preamble patterns and the bit-reversed values of these patterns must be tested, due to the possibility of bit reversal induced by the phase tracking loop. The reversal of preamble bits must be applied jointly to the consecutive potential preamble pairs. Frame sync is declared when the two or more consecutive preamble candidates match those transmitted by WAAS, with the same bit-reversal decision applied across all preambles. Once frame sync is declared, the ½ cycle carrier phase correction is applied for those signals whose framing preambles required bit-reversal. In this embodiment, ½ cycle is added to the WAAS carrier phase if the preamble bits are reversed, but it could be subtracted as well since whole cycles can be made-up by the ambiguity algorithms.

In order to solve for integer ambiguities from both WAAS and GPS satellite signals, double differencing is used to bring forth the integer nature of the ambiguities by removing other non-integer sources of error such as clock and atmospheric delays from the measurements.

To illustrate, consider four equations describing pseudoranges resulting from measurements of carrier phase on receivers denoted m and n for the rover and reference, respectively:

$$\phi_m^i = R_m^i + \tau sv^i + A^i + B_m + N_m^i$$

$$\phi_n^i = R_n^i + \tau sv^i + A^i + B_n + N_n^i$$

$$\phi_m^k = R_m^k + \tau sv^k + A^k + B_m + N_m^k$$

$$\phi_n^k = R_n^k + \tau sv^k + A^k + B_n + N_n^k$$

Here $\phi_m^i$ is the measured pseudorange from rover receiver m to satellite i, $\phi_n$ is the measured pseudorange from reference receiver n to satellite i, $\phi_m^k$ is the measured pseudorange from rover receiver m to satellite k, and $\phi_n^k$ is the measured pseudorange from reference receiver n to satellite k. Each pseudorange is actually a measure of the summation a number of different physical quantities all of which shall be expressed in units of carrier cycles at L1 (roughly 19 cm). Specifically, in the first of these equations, the term $R_m^i$ is the true geometric range from receiver m to satellite i, $\tau sv^i$ is the clock error of satellite i, $A^i$ is the atmospheric delays, which are associated with satellite i, $B_m$ is the clock error of receiver m, and $N_m^i$ is the integer ambiguity in the range measurement from receiver m to satellite i. Similar notation applies to the remaining three equations. For simplicity, these equations do not show noise effects such as errors caused by receiver thermal noise or multipath noise.

Consider first applying the single difference. If the first two equations are differenced:

$$\phi_m^i - \phi_n^i = R_m^i - R_n^i + B_m - B_n + N_m^i - N_n^i$$

Similarly, differencing the second two equations yields:

$$\phi_m^k - \phi_n^k = R_m^k - R_n^k + B_m - B_n + N_n^k - N_n^j$$

The satellite common errors, such as satellite clock, $\tau sv^i$ and atmosphere, $A^i$ (atmosphere is common if we assume relative close proximity of receivers m and n) are removed in the single difference. Receivers that are farther apart apply ionosphere corrections, derived from the WAAS message, that help to offset non-common, ionospheric propagation delay errors within $A^i$ that are not removed by the single difference.

Now forming a double difference, results in:

$$\phi_m^i - \phi_n^i - \phi_m^k + \phi_n^k = R_m^i - R_n^i - R_m^k + R_n^k + N_m^i - N_n^i - N_m^k + N_n^k$$

Since the ambiguities are all integers that can be lumped together into a single term, it may be written:

$$\phi_m^i - \phi_n^i - \phi_m^k + \phi_n^k = R_m^i - R_n^i - R_m^k + R_n^k + N_{mn}^{ik}$$

where $$N_{mn}^{ik} = N_m^i - N_n^i - N_m^k + N_n^k$$

This shows that double differencing the pseudorange measurements removes clock and common atmospheric errors from the equations while leaving simple combinations of the geometric ranges and integer ambiguities. For N satellites in common view of the reference and remote GPS receivers, there are N-1 such double-difference equations that can be formed without causing mathematical redundancy. This gives rise to N-1 unknown integer ambiguities that must be solved in addition to the 3 unknown coordinates (X, Y, Z) of the GPS receiver. Note that each geometric range term, for example $R_m^i$, is a function only of the receiver's position and the transmitting satellite's position. Specifically:

$$R_m^i = \sqrt{(Xrecv_m - Xsat^i)^2 + (Yrecv_m - Ysat^i)^2 + (Zrecv_m - Zsat^i)^2}$$

where $Xrecv_m$, $Yrecv_m$, $Zrecv_m$ are the Cartesian coordinates of the receiver m at the time reception of the signal from satellite i, whose coordinates are $Xsat^i$, $Ysat^i$, $Zsat^i$ at the time of signal transmission. In the problem at hand, only the rover's position is unknown. Once the ambiguities are determined, only the rover's 3-coordinates of position are unknown and these are easily solved using a mathematical approach such as Least Squares.

The complete set of ambiguities must be solved once at initialization, and then solved again only in catastrophic events such as recovering from multiple blockages of satellite signals or recovering from a lengthy gap in communication between the rover 42 and the reference 43. Once the ambiguities are known they remain fixed except for the occasional "cycle slip" that arises because of poor signal tracking conditions (perhaps signal blockage) on a particular satellite. Usually "cycle slips" are easily corrected by matching the pseudorange involving the "cycle slip" with the known geometric range to the satellite as determined from receiver's known position, that itself, is based upon other good measurements that have not "cycle-slipped".

Solving for the complete set of ambiguities is very difficult. One feature of the current invention is to reduce this difficulty by the use of WAAS satellites and the correction information made available by them.

In order to solve for the complete set of ambiguities, a search is conducted of all ambiguity set contenders that fall within some limit, say ±10 carrier cycles on each ambiguity. Then the set of ambiguities that fits the equations best is chosen, as described in the subsequent paragraphs. In practice, the number of sets of ambiguities that must be searched depends on how accurately the ranges can be ascertained from other information, such as, in this embodiment, measurements of code phase. In the search, the redundancy that results from a mathematically over-determined set of equations and unknowns helps to discriminate the true ambiguity set from other false contenders.

At each trial set of ambiguities, the system of double difference equations are solved simultaneously for position solution that results from the ambiguity set under consideration. More than three double difference equations are required, since exactly three (assuming adequate geometry) will give what appears to be a valid position solution for any set of ambiguities, not just the correct set. Assuming more than three linear independent equations (e.g., good geometry), then in the absence of noise or other measurement errors, only one set of ambiguities will cause all double difference equations to agree exactly, and the resulting position solution will be the correct solution.

In most applications, noise, measurement errors, and poor satellite geometry are often present and these tend to degrade the ability to resolve the ambiguities. This leads to the wrong integers being chosen and thus false positions. However, as the number of measurements, and hence the number of equations are increased, the degree at which all measurements agree on any one position solution, based on a summation of the squares of post-fit residuals, will typically become more pronounced. This helps to overcome the offsetting characteristics of noise and poor geometry. Consequently, with more measurements, the likelihood of choosing the wrong ambiguities diminishes. It is therefore advantageous, as exemplified by the present invention, to use the additional measurements provided by WAAS satellites particularly, on L1 only receivers that are already often lacking redundant measurements.

FIG. 5A shows a simplified two-dimensional case of redundant measurements. The carrier wave fronts 204–206 are generated by three GPS satellites SV1–SV3. At the carrier frequency L1, each wave front is separated from the next by approximately nineteen centimeters as shown by the wavelength 200. PRN code measurements are too coarse to sort out which wave front is the correct wavefront to within any one cycle. The wave fronts are thus ambiguous and represent the well-known carrier phase integer ambiguity problem. To solve the ambiguity problem, the correct three wave fronts must be chosen from the three sets of parallel fronts, and the resulting position is at the intersection of these three wave fronts. In this example, due to poor geometry, there are two potential solutions, circled at intersection points 201 and 202 and both appear equally probable.

FIG. 5B shows again the same three wave fronts 204–206, but this time an another wave front 203 is added from WAAS SV. The extra wave front provides enough additional information to clearly sort-out the correct solution 201. It is now the only position that contains an intersection of all four wave fronts. Clearly, the extra carrier information from WAAS can be useful.

As mentioned previously, another source of error in applying RTK positioning, especially when solving for integer ambiguities, is non-common atmospheric propagation delays on the signals received by the rover and reference receivers. Since differencing cannot eliminate these non-common delays, the next best alternative is to estimate or model their effects.

WAAS satellites broadcast among their various messages an ionospheric vertical delay map for the region of intended coverage. The map models the ionosphere as a thin shell, typically at 450 kilometers and vertical delays are given for the L1 frequency of transmission used by both GPS and WAAS. GPS user equipment can then determine pierce-points of the tracked signals as they penetrate this shell and extract the vertical delay component at this point of intersection. Next, by converting the vertical delay quantities into the appropriate slant-delays (see RTCA/DO-229A, Jun. 8, 1998), the GPS receiver software obtains an estimate of the ionosphere delay in the transmitted L1 signal.

Although the ionosphere map is intended for absolute positioning, the invention brings forth a method to apply it to differential GPS positioning and in particular the RTK positioning problem. Consider again the equations of measurement of GPS or WAAS carrier phase signals:

$$\phi_m^i = R_m^i + \tau s v^i - I_m^i + T_m^i + B_m + N_m^i$$

$$\phi_n^i = R_n^i + \tau s v^i + - I_n^i + T_n^i + B_n + N_n^i$$

Here, the atmospheric effects of ionosphere and troposphere have been explicitly included in the equation. Notation is similar to the preceding discussion, however, with atmospheric term $A^i$ replaced by its two primary constituents. That is, $I_m^i$ is the ionospheric effect on the signal traveling from satellite i to receiver m while $T_m^i$ is the effect of troposphere on the same signal. Similarly, $I_n^i$ is the ionospheric effect on the signal traveling from satellite i to receiver n while $T_n^i$ is the effect of troposphere. Note that we assign subscripts m and n to $I_m^i$, $T_m^i$, and $T_n^i$ since we no longer assume that signals traveling to receivers m and n are affected identically by the atmosphere. As before, the various terms in these equations are expressed in carrier cycles at L1 frequency.

The effect of the ionosphere on carrier phase is exactly the opposite of its effect on the code phase. The ionosphere delays the code phase while the carrier phase is advanced. The negative sign on $I_m^i$ and $I_n^i$ in the above equations reflect this since the carrier phase will appear shortened with respect to the true geometric range. Considering only satellite m the equation for code phase $\rho_m^i$ is thus:

$$\rho_m^i = R_m^i + \tau s v^i + I_m^i + T_m^i + B_m$$

Where the ionospheric term $I_m^i$, has been added to signify the additional delay, thereby, causing the appearance of increased range in the code-phase measurement. Note that the ambiguity term is not present and that, unlike the phase equations, the units for the various terms of this equation are typically meters. The above measurement equation is the more conventional from used in standalone code-based GPS receivers employing WAAS corrections in the typical manner. Typically, in such applications, the term $IWAAS_m^i$ that is obtained from interpolating the ionospheric grid at the signal's pierce point will be subtracted out of the code-phase measurement. That is, $IWAAS_m^i$ is used as an estimate of $I_m^i$.

Consider now differencing the two equations for the carrier phase observation equations:

$$\phi_m^i - \phi_n^i = R_m^i - R_n^i + B_m - B_n + N_m^i - N_n^i + (I_n^i - I_m^i) + (T_m^i - T_n^i)$$

The term $(T_m^i - T_n^i)$ relating to troposphere induced delay must be estimated with a mathematical model, perhaps with this model being assisted with measurements from a barometer, etc., or it must be determined by other conventional techniques. The term $(I_n^i - I_m^i)$ is estimated using the WAAS ionospheric map as described in the following the steps.

1. Determine the pierce point of the signal arriving from satellite i and received by receiver m. Do the same for satellite i and receiver n. The difference equations involving satellite i will contain ionospheric effects that shall be modeled as occurring at these pierce points. Although absolute modeling errors will be subtracted away by differencing the two equations involving satellite i, some residual ionospheric errors will remain.
2. From the WAAS ionospheric map determine, for each pierce point determined in step 1, the three or four surrounding map points necessary to interpolate the value of the vertical delay at the pierce point from the values of vertical delays at the map points. The WAAS ionospheric delay map is provided over a grid that is spaced along the longitudinal and latitudinal directions of the ionospheric shell and the delays are expressed in units of meters at the L1 GPS frequency. The grid points are arranged in triangular patterns and points are spaced to give uniform density, with approximately 5 degree spacing used at the lower latitudes, increasing to approximately 10 degrees at higher latitudes. The interpolation scheme details are provided in RTCA/IDO-229A, Jun. 8, 1998. It is important that the interpolation be performed consistently and without errors, since this avoids any discontinuities that create biases when performing the differences.
3. Compute the slant delay using the equations given in RTCA/DO-229A. The slant delay at low satellite elevations will be roughly 3 times that of the vertical delay taken directly from the map. In contrast, satellites at the zenith will directly use the vertical delay without any additional scaling (e.g., the zenith slant delay scale factor is 1.0).
4. Form the difference between each of the two slant delays obtained for satellite i when viewed by both the rover and reference receivers. The differencing process effectively causes any first-order modeling errors introduced by the ionosphere map to cancel. Consequently, only the gradient (or shape) of the surface modeled by the map becomes important. Although the model's shape is likely to contain errors with respect to the true ionospheric delays, it is still likely that the slopes and magnitudes of the model will somewhat represent the truth, at least statistically. To be beneficial, it is only necessary that the map model the gradient between two pierce points with sufficient accuracy to be better than no map at all.
5. Add to the difference of carrier phase measurements, $\phi_m^i - \phi_n^i$, the result of step 4 to form an ionospheric corrected carrier phase measurement. That is:

$$(\phi_m^i - \phi_n^i)|_{corrected} = (\phi_m^i - \phi_n^i) + (IWAAS_m^i - IWAAS_n^i)/\lambda_{L1}.$$

Here, we explicitly show the division by the carrier wavelength $\lambda_{L1}$ to convert from meters to cycles.

6. Subtract from the difference of code phase measurements, $\rho_m^i - \rho_n^i$, the result of step 4 to form an ionospheric corrected code phase measurement. That is:

$$(\rho_m^i - \rho_n^i)|_{corrected} = (\rho_m^i - \rho_n^i) - (IWAAS_m^i - IWAAS_n^i).$$

Although code phase is of less importance to RTK than carrier phase, it is often used initially to help set limits in the search for the ambiguities, often in what is termed a float ambiguity solution.

Step 5 describes the correction to carrier phase measurements. To the extent that the WAAS model of the ionosphere delay difference, $(IWAAS_m^i - IWAAS_n^i)$, matches the true ionosphere delay difference $(I_m^i - I_n^i)$ the ionosphere effects will vanish from the difference equation as desired. Suppose for example that:

$$I_m^i = IWAAS_m^i + B$$

and $$I_n^i = IWAAS_n^i + B$$

Where B is an arbitrary bias in the WAAS model with respect to truth that effects signals at both pierce points equally. Although the bias is present in the model, the difference in the model will exactly equal the difference in the true ionosphere:

$$IWAAS_m^i - IWAAS_n^i = I_m^i - I_n^i$$

Consequently, in this example, applying the WAAS correction truly removes all ionospheric terms from the difference equation. In practice, the terms will never match perfectly (B will not be the same at both pierce points) but often, the predominant source of error in the WAAS model will be differenced away nevertheless. This is equivalent to stating that the first term in a Taylor Series expansion of the WAAS ionospheric modeling errors about a single point is the dominant term. This is likely in regions that do not exhibit strong spatially dependent variations in ionospheric induced delay.

The cycle slip detection algorithm employing the WAAS carrier phase measurements is now described in step-wise fashion. These steps as described herein identify an exemplary embodiment of the invention. Nevertheless, the use of WAAS satellites for other embodiments will become evident to those with reasonable knowledge in the field.

1. Determine an initial estimate of the rover receiver's position at each 0.2 second interval time-epoch using measurements of carrier phase from both GPS and WAAS satellites. The WAAS satellite adds an additional measurement that would not otherwise be available in prior art. Standard least squares techniques are used to solve for position and receiver clock-offset in this embodiment, but a Kalman filter could be used as well. The rover receiver's position is determined as relative to the reference receiver's position since differential GPS is utilized. That is, the mathematical difference is formed between the rover receiver's measurement of carrier phase and the reference receiver's measurement of carrier phase for each satellite in common view to both. The underlying mathematical model of the Least-Squares solution is based upon these range difference equations. Four unknown quantities are solved together: the rover's 3 coordinates of position and its one coordinate of time, all of which are relative to the reference receivers own coordinates.

Solution of the four unknowns requires that at least four measurements be available, none of which contain cycle slips. Additional measurements may contain cycle slips, and it is the purpose of this procedure to resolve these cycle slips.

2. In step 1, discard from the solution any measurements that have pre-fit residuals greater than one meter in absolute value after subtracting, from each, the pre-fit residual of smallest absolute value. This catches obvious cycle slips while still allowing the receiver's clock to jump. The threshold of one meter should be adjusted if position updates are performed more or less often than once every 0.2 seconds.

3. Assuming more than four measurements are still available after step 2, (for which the likelihood has increased by the inclusion of the WAAS satellite), solve again, using Least Squares, for the position and clock offset of the rover receiver. This time, however, apply a significantly lower weighting to the measurement with the largest post-fit residual from the Least Squares solution of step 1. The weight should be at least one order of magnitude lower than weights applied to the other measurements 4. Re-evaluate the post-fit residuals that result from the solution of step 3, and in particular the residual that had its weighting lowered. If the residual is above ½ cycle in magnitude (10 cm), declare a cycle slip on the corresponding measurement of phase. Retain the position that resulted from lowering the residual's weighting as the new position of the receiver. Otherwise, if the residual is below ½ cycle in magnitude, discard the new solution and weightings and retain the previous solution and weightings.

5. If a cycle slip was declared in step 4 for the measured phase, compute the integer value that must be added to this phase to bring the resulting residual to as near to zero as possible. Add this cycle slip correction to the ambiguity term so that it is applied to all future measurements.

6. Repeat steps 3 through 5 again if more than five measurements are available, however in step 3, select a measurement different from the one evaluated previously. That is, search through all residuals to find the one with largest magnitude, excluding any residuals that have been tested previously.

The disclosed invention may be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or as data signal transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A receiver system, comprising:
   a first receiver for determining a first plurality of global positioning system (GPS) carrier phases from a first plurality of GPS signals, determining a Wide Area Augmentation (WAAS) carrier phase from at least one WAAS satellite signal, and issuing information for said first plurality of GPS carrier phases and said WAAS carrier phase in a first output signal;
   a second receiver for determining a second plurality of GPS carrier phases from a second plurality of GPS signals and a second WAAS carrier phase from said at least one WAAS satellite signal, and issuing information for said second plurality of GPS carrier phases and said WAAS carrier phase in a second output signal;
   a device for receiving said first output signal and said second output signal and computing a location vector between a geographical location of said first receiver and a geographical location of said second receiver based upon differences between said first plurality of GPS carrier phases and said second plurality of GPS carrier phases and said first WAAS carrier phase and said second WAAS carrier phase;
   one or more links for communicating said first output signal from said first receiver to said device and said second output signal from said second receiver to said device.

2. The receiver system of claim 1, further including: said second receiver, which may be a plurality of receivers; said second plurality of GPS carrier phases, which may be a plurality; said second plurality of GPS signals, which may be a plurality; said second WAAS carrier phase, which may be a plurality; and said at least one WAAS satellite signal, which may be a plurality.

3. The receiver system of claim 1, wherein said receiving and said computing may be distributed between said device, said first receiver, and said second receiver.

4. The receiver system of claim 1, wherein said device may be integral with said second receiver.

5. The receiver system of claim 1, wherein said device may be integral with said first receiver.

6. The receiver system of claim 1, wherein said second plurality of satellites may be identical to said first plurality of satellites.

7. The system of claim 1, wherein said first plurality of satellites and said second plurality of satellites include GPS, GLONASS, WAAS, EGNOS, MAST, AND GNSS satellites.

8. A method of determining a relative position between at least two locations, the method comprising:
   receiving at a first location a first plurality of satellite signals from a first plurality of satellites including at least one WAAS satellite and receiving at a second location a second plurality of satellite signals from a second plurality of satellites including said at least one WAAS satellite over a common time period;
   processing said first plurality of satellite signals from each satellite of said first plurality of satellites;

processing said second plurality of satellite signals from each satellite of said second plurality of satellites;

calculating a first plurality of pseudoranges from measurements of a first plurality of timing patterns contained within said first plurality of satellite signals;

calculating a second plurality of pseudoranges from measurements of a second plurality of timing patterns contained within said second plurality of satellite signals;

establishing said first location as a reference location and reference position;

computing a plurality of true ranges between said reference location and each satellite of said first plurality of satellites; and communicating information derived from said computing to said second location in an output signal.

9. The method of claim 8, further comprising:

receiving said output signal at said second location;

determining a plurality of difference terms by forming a difference between each pseudorange of said first plurality of pseudoranges and each corresponding pseudorange of said second plurality of pseudoranges respectively; and solving equations involving said plurality of difference terms and involving said plurality of true ranges to obtain said relative position of said second location relative to said first location.

10. The method of claim 8, further comprising:

receiving said output signal at said second location;

determining a plurality of correction terms by forming a difference between each true range of said plurality of true ranges and each corresponding pseudorange of said first plurality of pseudoranges;

adding each correction term of said plurality of correction terms to each corresponding pseudorange of said second plurality of pseudoranges to form a plurality of corrected pseudoranges; and solving equations involving said plurality of corrected pseudoranges to obtain said relative position of said second location relative to said first location.

11. The method of claim 9, wherein said relative position between at least two locations is determined by double differences of said plurality of difference terms.

12. The method of claim 10, wherein said relative position between at least two locations is determined by double differences of said plurality of corrected pseudoranges.

13. The method of claim 8, wherein said first plurality of satellites and said second plurality of satellites include GPS, GLONASS, WAAS, EGNOS, MSAT and GNSS satellites.

14. The method of claim 8, wherein said first plurality timing patterns are pseudorandom codes.

15. The method of claim 8, wherein said second plurality of timing patterns is pseudorandom codes.

16. The method of claim 8, wherein said first plurality of timing patterns and said second plurality of timing patterns are pseudorandom codes.

17. The method of claim 8, wherein said first plurality of timing patterns are carrier phases.

18. The method of claim 8, wherein said second plurality of timing patterns are carrier phases.

19. The method of claim 8, wherein said first plurality of timing patterns and said second plurality of timing patterns are pseudorandom codes and carrier phases.

20. The method of claim 8, further including:

retrieving a map of ionospheric vertical delays from a WAAS broadcast message;

determining a plurality of pierce points for said first plurality of satellite signals and said second plurality of satellite signals as they intersect an ionospheric shell assumed by said map;

fitting data from said map to said plurality of pierce points and computing slant delays at said plurality of pierce points; and applying ionospheric delays for satellites seen in common at said at least two locations to reduce errors in said determining relative position.

21. The method of claim 17, further including determining whether a cycle slip has occurred in measurement of carrier phase from additional carrier phase data available from a WAAS signal.

22. The method of claim 18, further including determining whether a cycle slip has occurred in measurement of carrier phase from additional carrier phase data available from a WAAS signal.

23. The method of claim 19, further including determining whether a cycle slip has occurred in measurement of carrier phase from additional carrier phase data available from a WAAS signal.

24. The method of claim 9, wherein determination of said relative position between at least two locations is facilitated by information received from an external source possessing additional knowledge of said plurality of difference terms.

25. The method of claim 10, wherein determination of said relative position between at least two locations is facilitated by information received from an external source possessing additional knowledge of said plurality of correction terms.

26. The method of claim 8, wherein said second plurality of satellites may be identical to said first plurality of satellites.

27. The method of claim 9, wherein carrier phase measurements of a WAAS satellite, which is seen in common to both said first location and said second location are used in to eliminate any integer ambiguity in said difference terms, yielding ambiguity-free difference terms.

28. The method of claim 10, wherein carrier phase measurements of a WAAS satellite, which is seen in common to both said first location and said second location are used in to eliminate any integer ambiguity in said plurality of corrected pseudoranges, yielding ambiguity-free, corrected pseudoranges.

29. A storage medium encoded with a machine-readable computer program code for determining a relative position between at least two locations, said storage medium including instructions for causing a computing system to implement a method comprising:

receiving at a first location a first plurality of satellite signals from a first plurality of satellites including at least one WAAS satellite and receiving at a second location a second plurality of satellite signals from a second plurality of satellites including said at least one WAAS satellite over a common time period;

processing said first plurality of satellite signals from each satellite of said first plurality of satellites;

processing said second plurality of satellite signals from each satellite of said second plurality of satellites;

calculating a first plurality of pseudoranges from measurements of a first plurality of timing patterns contained within said first plurality of satellite signals;

calculating a second plurality of pseudoranges from measurements of a second plurality of timing patterns contained within said second plurality of satellite signals;

establishing said first location as a reference location and reference position;

computing a plurality of true ranges between said reference location and each satellite of said first plurality of satellites; and communicating information derived from said computing to said second location in an output signal.

30. The storage medium of claim 29, further including instructions for causing a computing system to implement a method comprising:

receiving said output signal at said second location;

determining a plurality of difference terms by forming a difference between each pseudorange of said first plurality of pseudoranges and each corresponding pseudorange of said second plurality of pseudoranges respectively; and solving equations involving said plurality of difference terms and involving said plurality of true ranges to obtain said relative position of said second location relative to said first location.

31. The storage medium of claim 29, further including instructions for causing a computing system to implement a method comprising:

receiving said output signal at said second location;

determining a plurality of correction terms by forming a difference between each true range of said plurality of true ranges and each corresponding pseudorange of said first plurality of pseudoranges;

adding each correction term of said plurality of correction terms to each corresponding pseudorange of said second plurality of pseudoranges to form a plurality of corrected pseudoranges; and solving equations involving said plurality of corrected pseudoranges to obtain said relative position of said second location relative to said first location.

32. The storage medium of claim 30, wherein said relative position between at least two locations is determined by double differences of said plurality of difference terms.

33. The storage medium of claim 31, wherein said relative position between at least two locations is determined by double differences of said plurality of corrected pseudoranges.

34. The storage medium of claim 29, wherein said first plurality of satellites and said second plurality of satellites include GPS, GLONASS, WAAS, EGNOS, MSAT and GNSS satellites.

35. The storage medium of claim 29, wherein said first plurality timing patterns are pseudorandom codes.

36. The storage medium of claim 29, wherein said second plurality of timing patterns is pseudorandom codes.

37. The storage medium of claim 29, wherein said first plurality of timing patterns and said second plurality of timing patterns are pseudorandom codes.

38. The storage medium of claim 29, wherein said first plurality of timing patterns are carrier phases.

39. The storage medium of claim 29, wherein said second plurality of timing patterns are carrier phases.

40. The storage medium of claim 29, wherein said first plurality of timing patterns and said second plurality of timing patterns are pseudorandom codes and carrier phases.

41. The storage medium of claim 29, further including instructions for causing a computing system to implement a method comprising:

retrieving a map of ionospheric vertical delays from a WAAS broadcast message;

determining a plurality of pierce points for said first plurality of satellite signals and said second plurality of satellite signals as they intersect an ionospheric shell assumed by said map;

fitting data from said map to said plurality of pierce points and computing slant delays at said plurality of pierce points; and applying ionospheric delays for satellites seen in common at said at least two locations to reduce errors in said determining relative position.

42. The storage medium of claim 38, further including instructions for causing a computing system to implement a method comprising: determining whether a cycle slip has occurred in measurement of carrier phase from additional carrier phase data available from a WAAS signal.

43. The storage medium of claim 39, further including instructions for causing a computing system to implement a method comprising: determining whether a cycle slip has occurred in measurement of carrier phase from additional carrier phase data available from a WAAS signal.

44. The storage medium of claim 40, further including instructions for causing a computing system to implement a method comprising: determining whether a cycle slip has occurred in measurement of carrier phase from additional carrier phase data available from a WAAS signal.

45. The storage medium of claim 30, wherein determination of said relative position between at least two locations is facilitated by information received from an external source possessing additional knowledge of said plurality of difference terms.

46. The storage medium of claim 31, wherein determination of said relative position between at least two locations is facilitated by information received from an external source possessing additional knowledge of said plurality of correction terms.

47. The storage medium of claim 29, wherein said second plurality of satellites may be identical to said first plurality of satellites.

48. The storage medium of claim 30, wherein carrier phase measurements of a WAAS satellite, which is seen in common to both said first location and said second location are used in to eliminate any integer ambiguity in said difference terms, yielding ambiguity-free difference terms.

49. The storage medium of claim 31, wherein carrier phase measurements of a WAAS satellite, which is seen in common to both said first location and said second location are used in to eliminate any integer ambiguity in said plurality of corrected pseudoranges, yielding ambiguity-free, corrected pseudoranges.

50. A computer data signal for determining a relative position between at least two locations, said computer data signal comprising code configured to cause a processor to implement a method comprising:

receiving at a first location a first plurality of satellite signals from a first plurality of satellites including at least one WAAS satellite and receiving at a second location a second plurality of satellite signals from a second plurality of satellites including said at least one WAAS satellite over a common time period;

processing said first plurality of satellite signals from each satellite of said first plurality of satellites;

processing said second plurality of satellite signals from each satellite of said second plurality of satellites;

calculating a first plurality of pseudoranges from measurements of a first plurality of timing patterns contained within said first plurality of satellite signals;

calculating a second plurality of pseudoranges from measurements of a second plurality of timing patterns contained within said second plurality of satellite signals;

establishing said first location as a reference location and reference position;

computing a plurality of true ranges between said reference location and each satellite of said first plurality of satellites; and communicating information derived from said computing to said second location in an output signal.

51. The computer data signal of claim 50, further comprising code configured to cause a processor to implement a method comprising:

receiving said output signal at said second location;

determining a plurality of difference terms by forming a difference between each pseudorange of said first plurality of pseudoranges and each corresponding pseudorange of said second plurality of pseudoranges respectively; and solving equations involving said plurality of difference terms and involving said plurality of true ranges to obtain said relative position of said second location relative to said first location.

52. The computer data signal of claim 50, further comprising code configured to cause a processor to implement a method comprising:

receiving said output signal at said second location;

determining a plurality of correction terms by forming a difference between each true range of said plurality of true ranges and each corresponding pseudorange of said first plurality of pseudoranges;

adding each correction term of said plurality of correction terms to each corresponding pseudorange of said second plurality of pseudoranges to form a plurality of corrected pseudoranges; and solving equations involving said plurality of corrected pseudoranges to obtain said relative position of said second location relative to said first location.

53. The computer data signal of claim 51, wherein said relative position between at least two locations is determined by double differences of said plurality of difference terms.

54. The computer data signal of claim 52, wherein said relative position between at least two locations is determined by double differences of said plurality of corrected pseudoranges.

55. The computer data signal of claim 50, wherein said first plurality of satellites and said second plurality of satellites include GPS, GLONASS, WAAS, EGNOS, MSAT and GNSS satellites.

56. The computer data signal of claim 50, wherein said first plurality timing patterns are pseudorandom codes.

57. The computer data signal of claim 50, wherein said second plurality of timing patterns is pseudorandom codes.

58. The computer data signal of claim 50, wherein said first plurality of timing patterns and said second plurality of timing patterns are pseudorandom codes.

59. The computer data signal of claim 50, wherein said first plurality of timing patterns are carrier phases.

60. The computer data signal of claim 50, wherein said second plurality of timing patterns are carrier phases.

61. The computer data signal of claim 50, wherein said first plurality of timing patterns and said second plurality of timing patterns are pseudorandom codes and carrier phases.

62. The computer data signal of claim 50, further including code configured to cause a processor to implement a method comprising:

retrieving a map of ionospheric vertical delays from a WAAS broadcast message;

determining a plurality of pierce points for said first plurality of satellite signals and said second plurality of satellite signals as they intersect an ionospheric shell assumed by said map;

fitting data from said map to said plurality of pierce points and computing slant delays at said plurality of pierce points; and applying ionospheric delays for satellites seen in common at said at least two locations to reduce errors in said determining relative position.

63. The computer data signal of claim 59, further including code configured to cause a processor to implement a method comprising: determining whether a cycle slip has occurred in measurement of carrier phase from additional carrier phase data available from a WAAS signal.

64. The computer data signal of claim 60, further including code configured to cause a processor to implement a method comprising: determining whether a cycle slip has occurred in measurement of carrier phase from additional carrier phase data available from a WAAS signal.

65. The computer data signal of claim 61, further including code configured to cause a processor to implement a method comprising: determining whether a cycle slip has occurred in measurement of carrier phase from additional carrier phase data available from a WAAS signal.

66. The computer data signal of claim 50, wherein determination of said relative position between at least two locations is facilitated by information received from an external source possessing additional knowledge of said plurality of difference terms.

67. The computer data signal of claim 52, wherein determination of said relative position between at least two locations is facilitated by information received from an external source possessing additional knowledge of said plurality of correction terms.

68. The computer data signal of claim 50, wherein said second plurality of satellites may be the same as said first plurality of satellites.

69. The computer data signal of claim 51, wherein carrier phase measurements of a WAAS satellite, which is seen in common to both said first location and said second location are used in to eliminate any integer ambiguity in said difference terms, yielding ambiguity-free difference terms.

70. The computer data signal of claim 52, wherein carrier phase measurements of a WAAS satellite, which is seen in common to both said first location and said second location are used in to eliminate any integer ambiguity in said plurality of corrected pseudoranges, yielding ambiguity-free, corrected pseudoranges.

* * * * *